United States Patent
Császár et al.

(10) Patent No.: US 8,576,845 B2
(45) Date of Patent: Nov. 5, 2013

(54) METHOD AND APPARATUS FOR AVOIDING UNWANTED DATA PACKETS

(75) Inventors: András Császár, Budapest (HU); Lars Westberg, Enköping (SE); Mats Näslund, Bromma (SE); Lars G. Magnusson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 163 days.

(21) Appl. No.: 13/059,515

(22) PCT Filed: Aug. 22, 2008

(86) PCT No.: PCT/SE2008/050954
§ 371 (c)(1),
(2), (4) Date: Feb. 17, 2011

(87) PCT Pub. No.: WO2010/021577
PCT Pub. Date: Feb. 25, 2010

(65) Prior Publication Data
US 2011/0142044 A1    Jun. 16, 2011

(51) Int. Cl.
*H04L 12/26* (2006.01)
(52) U.S. Cl.
USPC ............ 370/390; 370/389; 370/231; 370/428
(58) Field of Classification Search
USPC ................. 370/389, 390–395, 231–237, 428, 370/395.2, 429, 466, 469; 709/230–236, 709/224, 392
See application file for complete search history.

(56) References Cited

U.S. PATENT DOCUMENTS

| | | | | |
|---|---|---|---|---|
| 6,816,489 B1 * | 11/2004 | Patra et al. | | 370/390 |
| 7,009,969 B1 * | 3/2006 | Parrish et al. | | 370/390 |
| 7,286,529 B1 * | 10/2007 | Thomas | | 370/389 |
| 7,343,485 B1 * | 3/2008 | Huang et al. | | 713/153 |
| 7,403,999 B2 * | 7/2008 | Corl et al. | | 709/230 |

(Continued)

FOREIGN PATENT DOCUMENTS

JP    2000-261486 A    9/2000

OTHER PUBLICATIONS

International Search Report, PCT Application No. PCT/SE2008/050954, Mar. 13, 2009.

*Primary Examiner* — Robert Wilson
*Assistant Examiner* — Sai Aung
(74) *Attorney, Agent, or Firm* — Myers Bigel Sibley & Sajovec, P.A.

(57) ABSTRACT

Method and apparatus for controlling transmission of data packets in a packet-switched network. When a first end-host (A) sends an address query to a DNS system (300) for a second end-host, the DNS system responds by providing a sender key created from a destination key registered for the second end-host, if the first end-host is authorized to send packets to the second end-host. Thereby, the first end-host, if authorized, is able to get across data packets to the second end-host by attaching a sender tag (TAG) generated from the sender key, as ingress tag to each transmitted data packet. A router (302) in the network matches an ingress tag in a received packet with entries in a forwarding table and sends out the packet on an output port (X) according to a matching entry. Otherwise, the router discards the packet if no matching entry is found in the table.

19 Claims, 4 Drawing Sheets

(56) References Cited

U.S. PATENT DOCUMENTS

| | | | |
|---|---|---|---|
| 7,680,956 B2* | 3/2010 | Volz et al. | 709/245 |
| 7,839,856 B2* | 11/2010 | Sinha et al. | 370/392 |
| 7,908,540 B2* | 3/2011 | Jeong et al. | 714/758 |
| 7,965,656 B1* | 6/2011 | Wijnands et al. | 370/256 |
| 2002/0085565 A1* | 7/2002 | Ku et al. | 370/395.42 |
| 2004/0098485 A1 | 5/2004 | Larson et al. | |
| 2004/0264464 A1* | 12/2004 | Wong | 370/390 |
| 2005/0169270 A1* | 8/2005 | Mutou et al. | 370/390 |
| 2006/0059337 A1 | 3/2006 | Poyhonen et al. | |
| 2006/0092861 A1* | 5/2006 | Corday et al. | 370/256 |
| 2006/0187927 A1* | 8/2006 | MeLampy et al. | 370/389 |
| 2007/0053296 A1* | 3/2007 | Yazaki et al. | 370/235 |
| 2007/0237147 A1* | 10/2007 | Quinn et al. | 370/392 |
| 2008/0037546 A1* | 2/2008 | Ishikawa et al. | 370/392 |
| 2008/0086574 A1* | 4/2008 | Raciborski et al. | 709/245 |

* cited by examiner

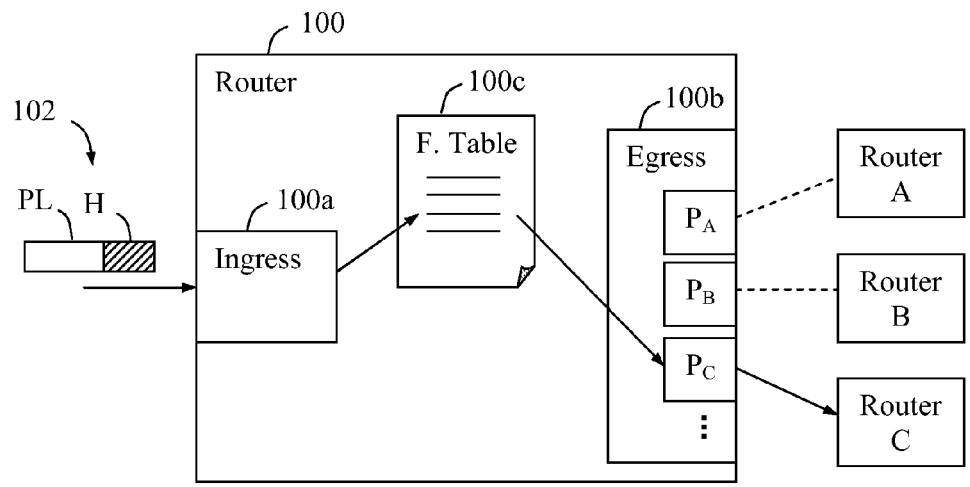
Fig. 1 (Prior art)
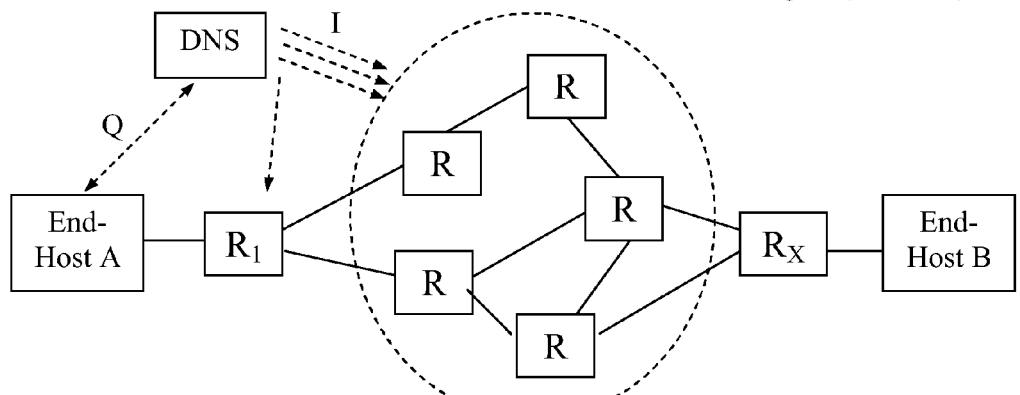
Fig. 2
| Key index (ingress) | Ingress key | Egress key | Key index (egress) | Port | Add data |
|---|---|---|---|---|---|
| ... | | | | | |
| IKi(x) | IK(x) | EK(x) | EKi(x) | P(x) | D(x) |
| ... | | | | | |
Fig. 2a

METHOD AND APPARATUS FOR AVOIDING UNWANTED DATA PACKETS

CROSS REFERENCE TO RELATED APPLICATION

This application is a 35 U.S.C. §371 national stage application of PCT International Application No. PCT/SE2008/050954, filed on 22 Aug. 2008, the disclosure and content of which is incorporated by reference herein in its entirety. The above-referenced PCT International Application was published in the English language as International Publication No. WO 2010/021577 A1 on 25 Feb. 2010.

TECHNICAL FIELD

The present invention relates generally to a method and apparatus for controlling transmission of data packets in a public packet-switched network such as the Internet, such that unwanted data packets can be avoided.

BACKGROUND

Packet-based transmission of digitally encoded information between different parties over IP (Internet Protocol) networks is used for a variety of communication services, such as e-mail messaging, Internet browsing, voice and video telephony, content streaming, games, and so forth. Digitally encoded information is arranged into data packets at a sending party, which are then transmitted towards a targeted receiving party over a transmission path. The transmission path between the sending party and the receiving party may include various networks, switches, gateways, routers and interfaces. The communicating parties are often referred to as "end-hosts" which may be any type of equipment capable of packet-based IP communication, such as fixed and mobile telephones, computers, servers, game stations, etc. In this description, the term end-host will generally represent any such communication equipment.

An end-host connected to the Internet or other IP network has typically been assigned a forwarding identity in the form of an IP address needed for routing any data packets directed to that end-host along a transmission path. Typically, the end-host has also been assigned a more or less intelligible name in a text string, e.g. a conventional e-mail address or web address, such as user@operator.com, which is associated with an assigned IP address of either the actual user/end-host or some other host receiving messages on behalf of the user. A DNS (Domain Name Server) system comprising a hierarchy of DNS servers is used for retrieving the current IP address of a particular host name. Thus, an end-host can query the DNS system with a host name to communicate with, and the DNS will then reply by providing the current IP address of the corresponding end-host. This type of query is sometimes referred to as a destination query, identity query or address query, the latter being used throughout this description.

Data packets are basically configured with a data field containing payload data and a header field in which the sending end-host inserts the destination address of the target end-host, i.e. the IP address obtained from the DNS system. Thus, each data packet is routed over multiple network nodes, generally referred to as IP routers, along a suitable transmission path based on the destination address in the packet's header field.

In addition to simply receiving and forwarding data packets, an IP router may also be capable of other functions such as security functions, packet scheduling, and translation of addresses and protocols. Further, end-hosts may have a filter/firewall functionality for determining whether incoming data packets should be admitted or discarded, e.g. according to settings typically made by a user or administrator associated with the end-host.

Each router in an IP network typically comprises ingress and egress units acting as interfaces for receiving and sending data packets, respectively. The router also comprises a routing or forwarding function for determining which router an incoming data packet should be sent to as a "next hop", based on a forwarding table defined in the router. As is well-known in this field, a data packet can often be routed along multiple alternative paths depending on the network topology and the current traffic load.

Links to the "nearest" neighbouring routers are provided in each router by means of corresponding ports, and a forwarding architecture is also configured in the routers based on the distribution of topology information and link information. Each port can have an IP address and an IP mask configured on its interfaces, and routing protocols are used to distribute this information among the routers in the network in a configuring procedure. From the distributed topology information, each router then calculates its own forwarding table, containing multiple destination IP-addresses and associated outgoing ports. As each incoming data packet has a destination IP-address in its header, the forwarding table is used to find the suitable entry in the forwarding table from that IP-address. The main function of the forwarding table is thus to determine the appropriate outgoing port, leading to the next hop router, for each incoming packet.

In FIG. 1, the basic structure of a conventional IP router 100 is shown, when situated in an IP network. Among other things, IP router 100 comprises an ingress part 100a, an egress part 100b and a forwarding function here schematically represented by a forwarding table 100c. The egress part 100b comprises a plurality of outgoing ports $P_A$, $P_B$, $P_C$, ... leading to different neighbouring routers A, B, C, ..., respectively, to which router 100 is directly connected. Any incoming data packet 102 has a payload field PL and a header H, the latter containing the destination address for the packet.

The forwarding table 100c is comprised of multiple entries each containing an IP mask, an IP address and an outgoing port number. The IP mask may be defined in terms of a hexadecimal encoded string such as, e.g., FF.FF.FF.0, or FF.FF.8.0, etc. Briefly described, the destination address in header H is combined with the IP masks in forwarding table 100c by applying a logic "AND"-operation, in order to detect a matching entry with the same IP address. The purpose of this masking mechanism is to aggregate the traffic towards several distinct destinations, and to simplify identification of the outgoing port for the aggregate. Effectively, the bit mask works similar to a "wildcard" when comparing and matching destination addresses to the entries. Once a matching entry is found, the packet can be sent out on the outgoing port according to the port number of that entry.

The incoming data packet 102, which may have been forwarded from a previous router (not shown) to router 100, is thus first received at the ingress unit 100a. It is then determined which next router the packet should be sent to, based on the destination address in header H and using the forwarding table 100c and the above logic "AND"-operation. In this example, the incoming packet 102 has a destination IP address that, when combined with the mask, matches the IP address of an entry in forwarding table 100c having port number $P_C$. The packet 102 is therefore sent out on the corresponding port which is connected to router C.

As mentioned above, a routing protocol is used to distribute topology and link information among the routers in an IP network. The currently used routing protocols are configured to obtain "resilience", i.e. packets must be re-routed in a different path in the case of link or node failure in the original path. The routing protocols are also configured to facilitate router management, since configuring routers is typically a cumbersome task which is generally desirable to simplify. Thus, in case of detecting failure in a link or node, the routing protocol will reconfigure the forwarding table in affected routers and at the same time distribute the information to the routers, thereby simplifying the management. In order to obtain scalability, which otherwise is an inherent problem in the routing architecture, the routing process can use traffic aggregation based on a hierarchical bit-mask scheme, which is well-known in the art and not necessary to describe here further.

However, a major problem in IP-networks and the Internet is that the security support is generally insufficient, as explained below. In a sense, the above mentioned resilience can sometimes make it "too easy" to get across packets through the network. This is because the current routing architecture and protocols were originally designed for a "friendly" environment, i.e. assuming that there are no "illicit" or "corrupt" users communicating in IP networks and that no protection is necessary for the transmission of data packets. Nevertheless, it has been found necessary or desirable to add various security solutions to the IP architecture in order to protect the communicated data, such as IP-sec on a low layer and also TLS (Transport Layer Security) on a higher layer. These protocols can provide authentication and encryption of the data packets. Further, MPLS (Multiprotocol Label Switching) is a solution for building Layer 3 VPNs (Virtual Private Networks) to ensure secure communication. In the VPN case when an intranet is used, private addressing is required and the network is somewhat isolated from the public Internet such that external un-authorized hosts are not allowed to reach and communicate with the hosts attached to the intranet.

Other prior solutions for providing security in the routing protocol include: secure communication between routers such that no illicit entity can eavesdrop, manipulate or imitate a router, the establishment of IP-sec tunnels between router ports to protect the transport of packets between routers, and link security on the layer 2, e.g. according to IEEE 802.1AE or IEEE 802.1Q. Various authentication procedures using cryptographic keys can also be used, e.g. according to DNS-Sec (DNS Security), HIP (Host Identity Protocol) and CGA (Cryptographically Generated Addresses), to enhance the security. However, while protection against unwanted traffic is used for certain applications (e.g. spam filtering for e-mails), no basic protection against violating end-hosts and unwanted data packets has been generally provided in the public IP infrastructure, though.

Since the internal forwarding identities, i.e. IP addresses, are publicly distributed end-to-end in the manner described above, any end-host is basically able to send messages and data packets to any other end-host over the Internet, resulting in the well-known problems of flooding, spamming, virus, fraud and so-called "Denial-of-service" (DoS) threats. Hence, it has generally become a problem that any end-host can get across data packets totally out of control of the receiving end-host, and that public packet-switched networks such as the Internet have no mechanism in the IP infrastructure for preventing that data packets from potentially illicit or corrupt end-users are routed to the receiver.

More or less complex functionality can be added though at the end-host or in the link layer, such as filters/firewalls or the like, in order to limit the connectivity. However, these solutions are "last line of defence" solutions, meaning that the transport of unwanted data packets can still consume network resources along the entire sender-receiver path, while the packets are anyway discarded at the receiver.

SUMMARY

It is an object of the present invention to address at least some of the problems outlined above. It is also an object to obtain a mechanism for avoiding transmission of unwanted data packets in a packet-switched network. These objects and others can be achieved by providing methods and apparatuses as defined in the attached independent claims.

According to one aspect, a method is provided in a router, for controlling transmission of data packets in a packet-switched network. When a data packet is received comprising an ingress tag derived from a sender key or router key using a first tag derivation function TDF known by the router, a matching operation is executed to the received ingress tag and at least one entry in a forwarding table. The table entry comprises an ingress key and a corresponding outgoing port number. The matching operation is executed by using the first TDF to determine whether the received ingress tag matches the ingress key in the table entry. If a matching table entry is found, the packet is sent to a next hop node from an outgoing port indicated in the matching table entry. Otherwise, if no matching entry is found, the packet is discarded.

In one embodiment, each matching operation includes applying the first TDF to a candidate ingress key in a row of the forwarding table to derive a candidate ingress tag. A match is considered to be found if the candidate ingress tag satisfies a predetermined relation with the received ingress tag in the packet. The predetermined relation may be equality, i.e. a match is considered to be found if the candidate ingress tag equals the ingress tag in the packet.

In another embodiment, an egress tag is created by applying a second tag derivation function TDF' to an egress key in the matching table entry, and the egress tag is attached to the data packet when sent to the next hop node.

In yet another embodiment, the received data packet further contains a key index pointing to an entry or a set of entries in the forwarding table, and the key index is used to find the proper entry/entries for the matching operation.

According to another aspect, an apparatus is provided in a router of a packet-switched network, for controlling transmission of data packets in the network. The router apparatus comprises an ingress unit adapted to receive a data packet with an ingress tag derived from a sender key or router key using a first tag derivation function TDF known by the router. Further, a tag matching unit is adapted to execute a matching operation to the received ingress tag and at least one entry in a forwarding table, the entry comprising an ingress key and a corresponding outgoing port number, using the first TDF to determine whether the received ingress tag matches the ingress key in the entry. The router apparatus also comprises an egress unit for sending the data packet to a next hop node, wherein if a matching entry is found in the forwarding table, the data packet is sent from an outgoing port indicated in the matching table entry, otherwise discarding the packet.

In one embodiment, the apparatus further comprises a tag creating unit adapted to create an egress tag by applying a second tag derivation function TDF' to an egress key in the matching table entry, and to attach the egress tag to the data packet when sent to the next hop node.

According to yet another aspect, a method is provided in a DNS system, for controlling transmission of data packets in a packet-switched network. Destination keys are registered for end-hosts, and router keys are distributed to routers in the network, each router key being derived from a registered destination key representing an end-host and/or from network topology information. When an address query is received from a first end-host regarding a second end-host, a sender key is created by applying a key derivation function KDF to at least a destination key associated with the second end-host. The sender key is then sent to the first end-host, thereby enabling the first end-host to get across data packets to the second end-host by attaching a sender tag generated from the sender key to a transmitted data packet, the sender tag directing the packet to the second end-host.

In one embodiment, authentication of the first end-host is required in order to process the query, and the query is rejected if the first end-host is not authenticated. Authorisation via DHCP may be required from the first end-host and a DHCP server may then provide to the first end-host a means for querying the DNS server system, only if the first end-host is authorised via DHCP.

In another embodiment, a policy defined for the second end-host is applied to the query to determine if the first end-host is authorised to send data packets to the second end-host, and the query is rejected if the first end-host is not authorised.

In further embodiments, the sender key is created by applying the KDF also to the identity of the first end-host, and/or a time stamp, and/or to a random number. The router keys may represent a single end-host or a set of multiple end-hosts depending on the network topology and the location of those end-hosts relative to the network topology. Key indexes may be distributed to the routers in the network, each key index identifying at least one of the router keys.

According to yet another aspect, an apparatus is provided in a DNS server system for controlling transmission of data packets in a packet-switched network. The DNS apparatus comprises a host database for registering destination keys associated with end-hosts, and a router key manager adapted to distribute router keys to routers, each router key being derived from a destination key representing an end-host and/ or from network topology information. The DNS apparatus also comprises an address query manager adapted to receive an address query from a first end-host regarding a second end-host, create a sender key by applying a key derivation function to at least a destination key associated with the second end-host, and to send the sender key to the first end-host in response to the address query. Thereby, the first end-host is enabled to get across data packets to the second end-host by attaching a sender tag generated from the sender key to a transmitted data packet, the sender tag directing the packet to the second end-host.

According to yet another aspect, a method is provided in an end-host equipment used by a first end-host, for enabling control of transmission of data packets in a packet-switched network. An address query is sent to a DNS system for a second end-host. In response thereto, a sender key is received from the DNS system that is derived from a destination key associated with the second end-host by applying a key derivation function KDF to at least the destination key of the second end-host. A sender tag is created by applying a tag derivation function TDF to at least the received sender key. The created sender tag is attached to data packets directed to the second end-host, which are sent to a first-hop router.

In one embodiment, a key index identifying one or more router keys in a forwarding table of a first-hop router, is also received from the DNS system in response to the query, and the key index is attached to data packets transmitted by the first end-host to the second end-host. The sender tag may be created by applying the TDF also to at least part of the payload in the packet and/or to a random number.

According to yet another aspect, an apparatus is provided in an end-host equipment, for use by a first end-host and for enabling control of transmission of data packets in a packet-switched network. The apparatus comprises an address query unit adapted to send an address query for a second end-host to a DNS system, and to receive a sender key from the DNS system derived from a destination key of the second end-host. The apparatus also comprises a tag creating unit adapted to create a sender tag by applying a tag derivation function TDF to at least the received sender key, and a packet sending unit adapted to attach the sender tag to data packets and then send the data packets to a first-hop router.

Further possible features and benefits of the present invention will become apparent from the detailed description below.

BRIEF DESCRIPTION OF THE DRAWINGS

The present invention will now be described in more detail by means of exemplary embodiments and with reference to the accompanying drawings, in which:

FIG. 1 is a schematic block diagram illustrating a conventional router in an IP network, according to the prior art.

FIG. 2 illustrates a typical transmission path scenario for routing data packets from a sending end-host A to a receiving end-host B, where the present invention can be utilised.

FIG. 2a illustrates a part of an exemplary forwarding table, according to one embodiment.

DETAILED DESCRIPTION

Figure 3:
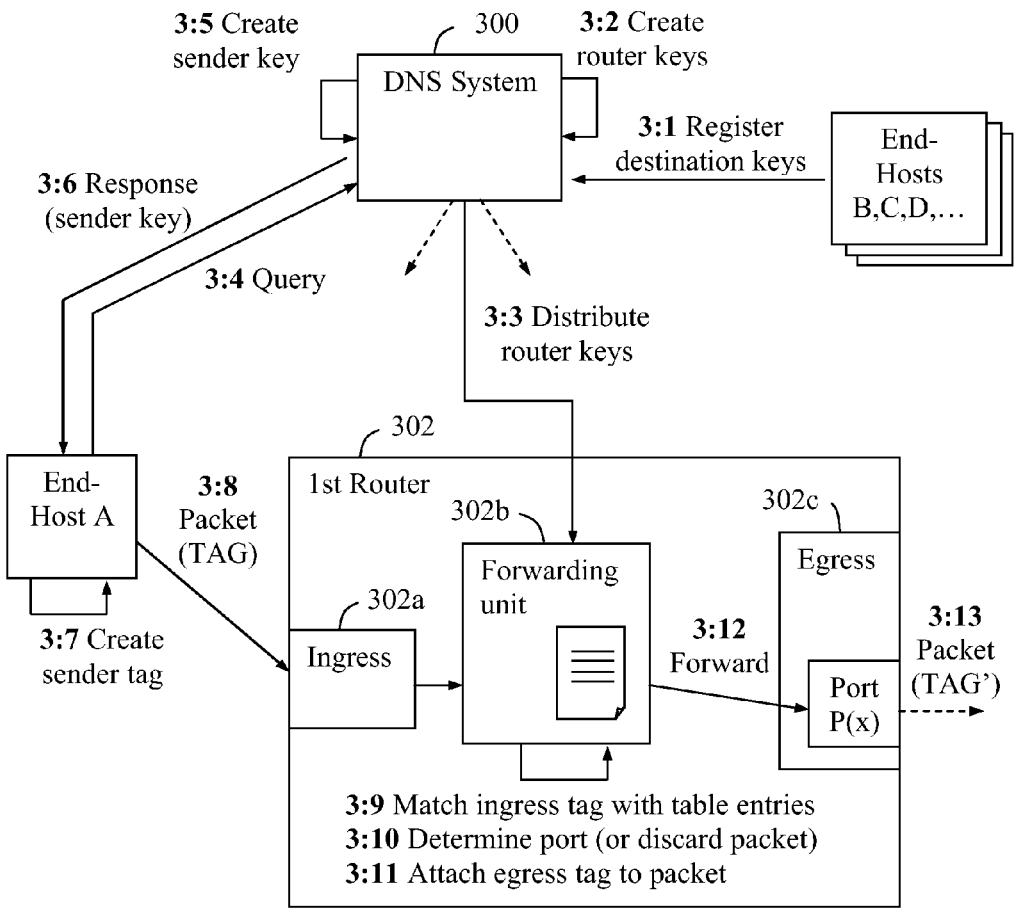
FIG. 3 is a block diagram illustrating how a sending end-host A can get across a data packet in a first-hop router, according to further embodiments.

The present invention provides a mechanism for controlling transmission of data packets through a packet-switched network along a transmission path between a sending end-host and a receiving end-host. In particular, end-hosts can be protected from receiving unwanted data packets in a manner to be described below. A typical transmission path scenario is schematically illustrated in FIG. 2, with the following nodes basically involved when transmitting data packets in accordance with embodiments described below: A sending end-host A connected to a first-hop router $R_1$, a plurality of intermediate Routers R that may potentially be used in the transmission path, and a last-hop router $R_x$ to which a receiving end-host B is connected, further involving a DNS server system for handling address queries Q and for generally distributing routing information I to the routers.

According to embodiments described below, a security solution can be built into the core protocol of the forwarding architecture used by routers in the network. Generally, any packets transmitted over a public packet-switched IP network must pass the forwarding mechanism in the forwarding plane of the routers in the transmission path, e.g. as described above. By embedding a packet forwarding control mechanism within the forwarding plane in a router, to be described below, the resulting security will effectively be enforced in the IP infrastructure to control the routing of any packet passing that router.

Briefly described, predefined implicit destination keys, associated with target end-hosts, and preconfigured router keys, associated with the destination keys and the network topology, are used instead of explicit IP addresses for routing data packets through the IP network. The DNS system thus registers such destination keys for end-hosts, being potential receivers of data packets, and provides a corresponding sender key rather than an IP address in response to an "address query" or the like from a querying end-host for a target end-host. In this description, the term "address query" should be understood as any query for information that can be used for authorising communication of data packets to the target end-host. The sender key is created by applying a "Key Derivation Function KDF" to at least the destination key and optionally also to the identity of the querying end-host, to be described in more detail below. The destination key is thus effectively "concealed" in the sender key.

The querying end-host then further derives a sender tag from the obtained sender key by applying a "Tag Derivation Function TDF" to the sender key, and inserts the sender tag in the header of each transmitted data packet of at least an ongoing data flow or session with the receiving target end-host. The sender tag thus implicitly encodes the destination key of the target end-host.

Further, the DNS system creates different router keys, based on the registered destination keys and/or the network topology, and distributes the router keys to routers in the IP network. The routers then configure their forwarding tables by means of the distributed router keys. As indicated above, the created router keys may be dependent on the network topology wherein a router key may point to a group of destinations or routers in the network to achieve aggregation, in order to reduce the forwarding table size in the routers. Optionally, the DNS system may also distribute key indexes for inclusion in the forwarding tables, each key index pointing to one or more rows in the table with different router keys, in order to facilitate the forwarding operation in a manner to be described below. In practice, the DNS system can basically assign a key index to each router key.

Thus, a forwarding table in a router has entries with router keys, corresponding outgoing ports and optional key indexes. Instead of an IP address, a tag is included in the header of each transmitted data packet, the tag being created by applying a TDF to the sender key and/or to a router key, depending on whether the packet is transmitted from the sending end-host or forwarded by a router. In this description, the tag in a sent or forwarded packet is generally referred to as an "egress tag" derived from an "egress key", whereas the tag in a received packet is referred to as an "ingress tag". Further, an "ingress key" is the key from which the received ingress tag has been derived.

In the forwarding operation performed by a router having received a data packet containing an ingress tag, the ingress tag is matched with the ingress keys in the forwarding table, and if a matching entry is found the corresponding outgoing port in that entry is selected for sending out the packet. A new egress tag, derived from an egress key in the matching table entry, is also attached to the packet header before sending out the packet on the outgoing port to the next-hop router. Alternatively, the ingress tag of the received packet may be reused as egress tag when forwarding the packet to a next-hop router, i.e. without changing the tag in the packet, depending on the forwarding table configuration in the router that performs the forwarding operation.

If no matching entry in the table is found, the packet may be handled according to a "default policy", e.g. dictating that the packet is discarded and not forwarded any further. The router will typically employ such a policy if some unauthorized sending end-host, not knowing the appropriate key, tries to get across a data packet with a "faked" tag inserted.

When the packet is received by the next-hop router, the process above will basically be repeated. If key indexing is used, a key index in the ingress tag of the received packet will point directly to one entry, or to a limited set of entries, in the forwarding table, thereby identifying the ingress key(s) in the entry/entries. The router can then limit the matching operation above to the ingress key(s) identified by the key index.

In this way, by not exposing the destination/sender/router keys to unauthorized parties, interception of explicit end-host addresses or identities that can be used by others to get across data packets, is not possible. As a result, unsolicited data packets to those end-hosts can be avoided. The sender and router keys and optional key indexing are thus useful in the forwarding operation performed by routers in the transmission path, in a manner to be described in more detail below with reference to specific exemplary embodiments. However, it should be noted that the use of such keys and tags does not necessarily exclude the use of conventional IP addresses for routing data packets, and traditional IP address routing and the inventive key/tag routing may well be accomplished in the same network.

FIG. 2a illustrates a forwarding table that can be used in the present solution, in which an exemplary entry or table row is denoted "x". The table has plural columns 200-210 comprising a first column 200 with an ingress key index "IKi" that can be used for finding one or more appropriate entries for executing the matching operation, i.e. matching an ingress tag attached to an incoming packet with an ingress key "IK" present in a second column 202 in the table. A single ingress key index may point to a set of multiple entries in the table to which the matching operation can be limited.

A third column 204 contains an egress key "EK" from which a new egress tag is to be created, once a matching entry is found, for inclusion in the forwarded packet. A fourth column 206 contains an egress key index "EKi" to be attached to outgoing data packets, which will effectively be used as the ingress key index when received by a next-hop router. A fifth column 208 contains a port number "P" indicating the port on which a received and matched packet is to be sent out towards the next-hop router.

Finally, an optional sixth column 210 may contain various additional data "D" that may be policy rules or the like, e.g. "drop packet", "use default port", "use aggregation . . . ", "retrieve new router key from DNS", "request previous hop router to explicitly authenticate itself", and so forth. If key indexing is not used, columns 200 and 206 will naturally be omitted. Further, it is possible to use the same tag as egress and ingress tag unchanged over two or more routers in the transmission path. In that case, columns 204 and 206 can be disregarded and each router receiving a data packet with an ingress tag may simply find the proper outgoing port in column 208 by matching the ingress tag with the ingress key(s) in column 202. The ingress tag will then be reused as egress tag and the key index, if used, is also unchanged when forwarding the packet to the next-hop router. Alternatively, the egress key EK may be equal to the ingress key IK, but a new computation of the egress tag is still performed, e.g. including new nonces to randomise the egress tag as described in more detail below.

FIG. 3 is a block diagram illustrating how the transmission of a data packet sent from an end-host A towards a target end-host, not shown, can be controlled in a packet-switched network having a certain known topology, according to some exemplary embodiments. This procedure is shown as a series of actions or steps mainly involving end-host A, a DNS system 300 and a first-hop router 302 to which end-host A is directly connected.

In a first step 3:1, destination keys associated with various end-hosts B,C,D, . . . are registered and stored in the DNS system 300, where each unique destination key actually identifies or "defines" a corresponding destination, i.e. end-host. In this process, a destination key may be settled in agreement between the end-host and the DNS system, preferably after authenticating the end-host. Effectively, this step can substitute the assignment of IP addresses to end-hosts according to the prior art. Moreover, it is not necessary to arrange the destination keys in a hierarchical system, and a "flat" naming structure can be used.

DNS system 300 further derives router keys from the above registered destination keys and the network topology in a next step 3:2, and may also define a key index for each router key. Each router key may be derived from a destination key or from a set of aggregated destination keys, the aggregation being based on the network topology and the location of the corresponding end-hosts. If key indexing is used, each key index identifies a router key or to a set of router keys. Then, DNS system 300 generally distributes the router keys and optional key indexes to routers in a router domain of the network, including the router 302 shown here, in a further step 3:3.

The routers are then able to configure their own forwarding tables accordingly, comprising the distributed router keys and optional key indexes which will be used for forwarding of incoming data packets, thereby creating a useful forwarding architecture in the network. This forwarding operation will be described in more detail later below. Basically, a tag included in an incoming data packet is an ingress tag corresponding to an ingress key as router key, and a tag included in an outgoing data packet is an egress tag corresponding to an egress key as router key. As a result, a router key can thus be either an ingress key or an egress key or include both.

A router key may further represent a single destination or an aggregated set of multiple destinations, as mentioned above. In the latter case, the number of entries in the forwarding table will be substantially reduced. If key indexing is used, the operation of matching an ingress key of an incoming packet with router keys in the forwarding table can be facilitated in a manner to be described later below.

The distribution of router keys associated with destination keys and the network topology, and optional key indexes, may be executed in a configuration process or otherwise, e.g. using a routing protocol such as when configuring a conventional forwarding architecture in a router domain as described above. The routers can then configure their forwarding tables with entries comprising different ingress and egress keys and outgoing ports, based on the distributed router keys and other topology information. A distributed router key may in fact include both an ingress key and an egress key. A specific key server may be responsible for distributing the router keys to routers in the domain, even though illustrated here as an action made by the DNS system 302 for simplicity. However, the distribution of router keys can be made in different ways, e.g. in a more dynamic manner triggered by address queries from end-hosts, or in response to queries from the routers, which will be described later below.

Returning to the example of FIG. 3, end-host A intends to communicate with a target end-host and at some point, in a next step 3:4, accordingly sends an address query or similar to the DNS system 300, e.g. referring to an e-mail address or web address of the target end-host in a conventional manner such as described above. Optionally, DNS system 302 may then apply a policy defined for the target end-host to the query, to determine if the querying end-host is authorised to send data packets to the target end-host or not. Other policies may also be applied, e.g. to dictate the route of communication in order to use a particular operator network and/or avoid another one, or use certain services, or redirect packets to another receiver, and so forth.

Assuming that end-host A is authorised and can be allowed to send packets to the target end-host, the DNS system 300 retrieves the destination key associated with the target end-host and creates a sender key from the destination key, in a following step 3:5. The sender key is created by applying a key derivation function KDF to at least the destination key and optionally also to other data such as the identity of the querying end-host, a time stamp, and/or a random number used for randomisation, often referred to as "RAND" or "NONCE". This can be expressed as:

$$\text{Sender key} = KDF(\text{Destination\_key}, <\text{other data}>) \quad (1)$$

If the identity of the querying end-host is used as "other data" in (1), the sender key will be uniquely associated with that end-host. KDF may preferably be a cryptographic function or the like.

In a further step 3:6, DNS system 300 then provides the sender key to end-host A, in response to the query of step 3:4, such that end-host A can derive a sender tag therefrom and send data packets to the target end-host with the sender tag attached as ingress tag. The first hop router 302 for end-host A also needs to be able to access the same sender key in order to perform a matching operation on the ingress tag, being the sender tag generated by the sending end-host. This can be accomplished in different alternative options, including the three examples described below.

First option: Assuming that key indexing is used, and that the DNS system knows which first-hop router will be used, the DNS system 300 may also provide a predefined key index to end-host A in step 3:6, the key index being relevant for the previously distributed router keys, i.e. the key that corresponds to the destination of the target end-host. The key index thus points to the correct row or set of rows in the forwarding table of the first-hop router 302, providing an outgoing port connected to a suitable next-hop router.

Second option: Router 302 may receive the sender key created in step 3:5 either in a notification from DNS system 300 that end-host A has made an address query towards the target end-host, or router 302 may fetch the sender key from DNS system upon receiving a first data packet from end-host A. The router 302 will then re-configure its forwarding table by adding the sender key and also additional information indicating the relation between network topology and traffic destination, which is not necessary to described here further.

Third option: The DNS system 300 includes an encrypted copy of the sender key to end-host A in step 3:6 to be included as is in the generated sender tag of the data packets. This can be done using an approach similar to "Kerberos" where the DNS system 300 encrypts a copy of the sender key with a specific encryption key known (only) by the router(s).

In order to send data packets towards the target end-host, end-host A applies a predefined first tag derivation function TDF to at least the received sender key, in a next step 3:7, to create a sender tag "TAG" to be inserted as egress tag in transmitted packets. Depending on the implementation, the TDF may also be applied to "other data" such as payload data contained in the packet to be sent, a time stamp, and/or to a RAND or NONCE used for randomisation. This can be expressed as:

$$\text{Sender\_tag} = TDF(\text{Sender\_key}, \text{<other data>}) \quad (2)$$

If payload in the packet is comprised in the "other data", the sender tag will be unique for that packet only. TDF may be a cryptographic function or the like. End-host A may have been preconfigured to use TDF when transmitting data packets, or TDF may be submitted to end-host A together with the sender key in step 3:6. Furthermore, TDF is also known in the network, at least to the first-hop router 302. According to different options, the TDF to use may be a predetermined agreed parameter, e.g. preconfigured network-wide and out-of-band, or end-host A may select a TDF to use from a set of predetermined TDFs known in the network, and then include a predetermined identifier for the TDF in the tag itself.

End-host A may also include a corresponding key index in the sender tag if received from DNS system 300 in step 3:6 above, as well as a Kerberos encrypted copy of the sender key if the third option above is used. Attaching the sender tag to a transmitted data packet will effectively authorise that packet to be routed towards its destination through the network. If a router detects that a received data packet does not contain any valid sender tag, the packet cannot be authorised and may simply be discarded.

In a further step 3:8, end-host A sends a data packet towards the target end-host with the created sender tag "TAG" attached as egress tag, and possibly also the key index and other data if used, which is received by an ingress part 302a at router 302. The sender tag can be inserted in the destination field in the packet header, just as the destination IP address would be conventionally according to the prior art. When received as an incoming packet at router 302, the sender tag "TAG" is an ingress tag and the key index is an ingress key index, if used.

So far, it has been assumed that end-host A is authorised to send packets and also that A is compliant in the sense of following the above-described embodiments, e.g. according to one of the three options. However, it should also be contemplated when a sending end-host is unauthorised to send packets and/or non-compliant and simply attempts to generate a valid sender tag without the assistance of the DNS. By a suitable choice of the TDF as a strong cryptographic function, however, any such forgery attempt will most likely not be successful and can therefore be neglected. In this description, end-host A is assumed to be authorised and compliant.

Being a first-hop router, router 302 must be able to detect the sender key from which the attached sender tag was created. This can be done e.g. according to the different options described above, which are further discussed below:

In the first option: If the DNS system 300 can predict the identity of the first hop router to be used by end-host A, DNS system 300 can simply derive the sender key in such a way that the first hop router is also capable to use existing entries in its forwarding table, or such that the router can use aggregated destinations already provided for in the forwarding table.

In the second option: The first-hop router 302 explicitly receives the sender key from DNS system 300, e.g. by fetching the sender key upon reception of the packet in step 3:8, or in a notification from DNS system 300 after steps 3:4-3:6. This key may then be cached in the router (e.g. as an update of the routing table) in preparation for receiving further packets from A.

In the third option: The above-mentioned Kerberos approach is used where the DNS system 300 includes a copy of the sender key, encrypted by, e.g., a "group encryption key" KR known to the router(s), to end-host A in step 3:6. End-host A then includes this encrypted copy in the generated sender/ingress tag, wherein the first hop router can retrieve the sender key by applying decryption using KR.

A forwarding unit 302b at router 302 is generally configured to perform a forwarding operation for each incoming data packet by means of a forwarding table schematically shown in forwarding unit 302b, in order to find an outgoing port in an egress unit 302c. In a further step 3:9, forwarding unit 300b executes a matching operation for the attached ingress tag "TAG" and different ingress keys IK in the forwarding table, using the known first tag derivation function TDF, in order to find a matching entry in the table. In other words, forwarding unit 300b tries to match the received ingress tag with an ingress key IK for one entry at a time in the table. It should be noted that in a first hop router, the ingress keys in the table will mostly correspond to sender keys.

In more detail, the matching operation may include that the router applies the TDF to a "candidate" ingress key in a row of the forwarding table to derive a candidate ingress tag. If the candidate ingress tag satisfies a predetermined relation with the ingress tag in the packet, a match is considered to be found. The predetermined relation may be equality, i.e. a match is considered to be found if the candidate ingress tag is identical to the ingress tag in the packet. If the two tags do not match, the next candidate key in the table is tried, and so forth. If an ingress key index IKi was included in the received packet, it is only necessary to perform the matching operation to the one or more entries in the table that contains that ingress key index IKi. Using an ingress key index IKi will thus effectively speed up the matching operation for each received data packet.

If a matching entry is found in step 3:9, the port in that entry, in this case port P(x), is determined as the outgoing port for the packet, in a following step 3:10. If no matching entry is found in step 3:9, the packet is not authorised and will therefore be discarded in step 3:10, thereby stopping any such packets from being forwarded. Performing the matching operation will effectively verify the packet for further transmission. If a key index is used, it is possible to find the proper port and forward the packet by means of the key index only, although the matching operation of step 3:9 can still preferably be performed for the sake of security.

In a next step 3:11, after the packet is found to be authorised in the forwarding operation above, forwarding unit 302b applies a second tag derivation function TDF' to the egress key EK in the matching entry, to obtain a new egress tag "TAG'" which is attached to the packet. If the next-hop router will perform a matching operation as well for the packet, the TDF' should be known by the next-hop router to enable the matching operation. TDF and TDF' may be different or equal functions. The new egress tag TAG' can thus be expressed as:

$$\text{Egress\_tag} = TDF'(\text{Egress router\_key}, \text{<other data>}) \quad (3)$$

The "other data" in (3) may be payload data contained in the packet to be sent, and/or a RAND or NONCE used for randomisation.

If key indexing is used, the egress key index EKi of the matching entry is also attached to the packet in step 3:11, e.g. in the destination field of the packet header. The attached EKi will then be used in the next-hop router as ingress key index IKi to find the relevant row(s) in its forwarding table for executing the matching operation, and so forth. As mentioned above, it is possible to use an unchanged ingress/egress tag between two or more successive routers, thus basically omitting step 3:11 above.

Next, the packet is forwarded to port P(x) of the egress unit 302c, in a following step 3:12. Finally, the packet with the new egress tag TAG' attached is sent out on port P(x) as the next hop, in a last step 3:13. The next-hop router will then be able to match the new ingress tag TAG' with entries in its forwarding table to determine the next hop, in the same fashion as described above. The last router Y in the transmission path, to which the target end-host is connected, may refrain from applying a TDF to create a new egress tag according to step 3:11, as the target end-host does not need to read the destination field at all.

The router keys distributed in step 3:3 which form the basis for the forwarding tables in the routers, may be defined by the DNS system 300 as follows:

$$\text{Router\_key} = KDF(\text{Destination\_key}, <\text{other data}>) \quad (4)$$

In the example of (4), the router key represents a single destination, i.e. end-host, having the destination key in question. However, if aggregation is used, a router key may represent a set of multiple destinations, i.e. end-hosts, depending on the network topology and the location of those end-hosts/destinations. The creation of such aggregated router keys is outside the scope of the present invention, though. Furthermore, a flag, header extension, or the like may be attached to the data packet to indicate the structure or format of the packet, i.e. with respect to an ingress tag and optionally also a key index.

Further security can also be added for authorising querying end-hosts at the DNS system in the following manner: Initially, when an end-host sends an address query to the DNS system, e.g. as in step 3:2 above, the end-host must know the address or corresponding destination identity of the DNS system for such queries. The DNS address could be a well-known address, but it could also be obtained only from a DHCP (Dynamic Host Configuration Protocol) server, which is a well-known node in the art. In one embodiment, the DHCP server provides a tag of the DNS required for making queries, which can only be obtained by hosts after being authenticated and authorised via DHCP. If an address query lacks the required tag of the DNS, the query will be denied and the querying end-host is prevented from sending packets to the target end-host. In this way, unsolicited data packets can be avoided by allowing only end-hosts authorised for DNS/DHCP to get across data packets in the forwarding procedure in routers.

Figure 4:
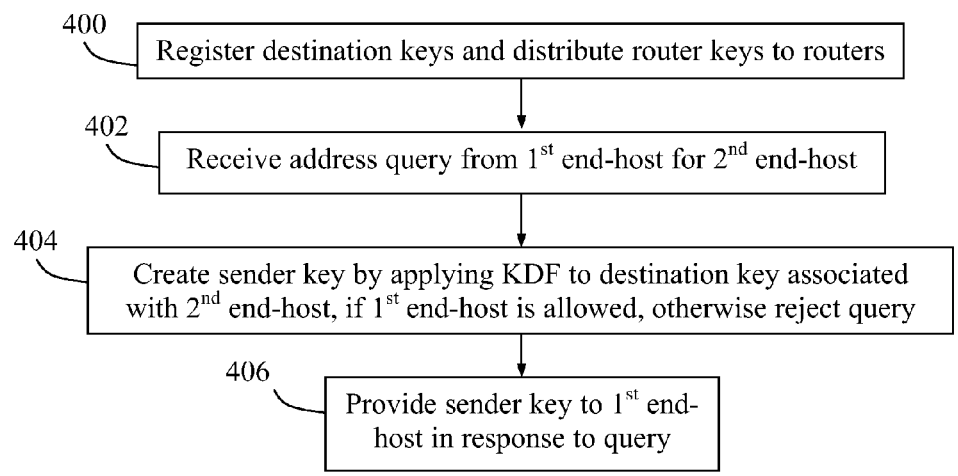
FIG. 4 is a flow chart with steps in a procedure performed by a DNS server system for controlling transmission of data packets in a packet-switched network, according to yet another embodiment.

FIG. 4 is a flow chart with steps in an exemplary procedure for controlling transmission of data packets in a packet-switched network, as executed by a DNS server system, e.g. the DNS system 300 in FIG. 3. In a first step 400, destination keys are registered for different end-hosts, and router keys derived from the destination keys and network topology are distributed to routers in the network. In practice, the router keys could be distributed from the DNS system or from an associated key server or the like. Step 400 could be executed in a configuration procedure or otherwise.

In a next step 402, an address query is received at some point from a first end-host, basically requesting a destination address or similar of a target second end-host. The address query can be made in a conventional manner such as described above, e.g. referring to an e-mail address or web address of the target end-host.

In a further step 404, the DNS system creates a sender key by applying a key derivation function KDF to at least a destination key associated with the second end-host, if the first end-host is authorised to send data packets to the second end-host. If not, the query may simply be rejected. KDF may further be applied to other data such as the identity of the first end-host to make the sender key unique for the first end-host, e.g. according to (1) above. Optionally, authentication of the first end-host via DHCP may be required in order to process the query, as described above.

A policy defined for the second end-host may also be applied to determine if the querying end-host is authorised to send data packets to the second end-host. If the first end-host is not authorised, the DNS system may reject the query, as implied by step 404. In this example, the first end-host is actually authorised to send data packets to the second end-host. As described for step 3:4 above, other policies may also be applied, such as using a preferred route or avoiding a non-preferred route, using certain services, functions or quality-of-service level, redirecting packets to another receiver, and so forth.

In a final step 406, the DNS system sends the created sender key to the first end-host in response to the query of step 402. Thereby, the first end-host is able to get across data packets to the second end-host, by applying a tag derivation function TDF to the received sender key to obtain a sender tag, basically in the manner described above for step 3:7, and then attaching the obtained sender tag to each transmitted packet.

Figure 5:
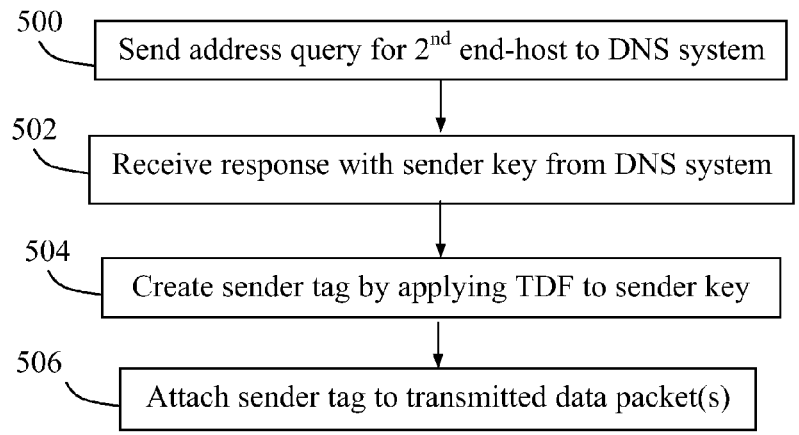
FIG. 5 is a flow chart with steps in a procedure performed by a packet sending end-host in a packet-switched network for enabling control of transmission of data packets, according to yet another embodiment.

FIG. 5 is a flow chart with steps in an exemplary procedure for enabling control of the routing of data packets in packet-switched network, as executed by a packet sending first end-host, e.g. end-host A in FIG. 3. In a first step 500, the first end-host sends an address query for a second end-host to the DNS system, corresponding to step 3:4 in FIG. 3. In response thereto, the first end-host receives a sender key derived from a destination key of the second end-host from the DNS system, in a next step 502 corresponding to step 3:6 in FIG. 3. A key index pointing to the proper entry/entries or row(s) in the first-hop router's forwarding table, may also be received together with the sender key.

In a following step 504, the first end-host creates a sender tag by applying a predefined TDF to the received sender key, corresponding to step 3:7 in FIG. 3. Finally, the first end-host attaches the created sender tag to one or more data packets which are transmitted over the network, in a step 506 corresponding to step 3:8 in FIG. 3. The first-hop router will then be able to determine the proper outgoing port by matching the received sender tag with entries in its forwarding table, basically in the manner described above.

Figure 6:
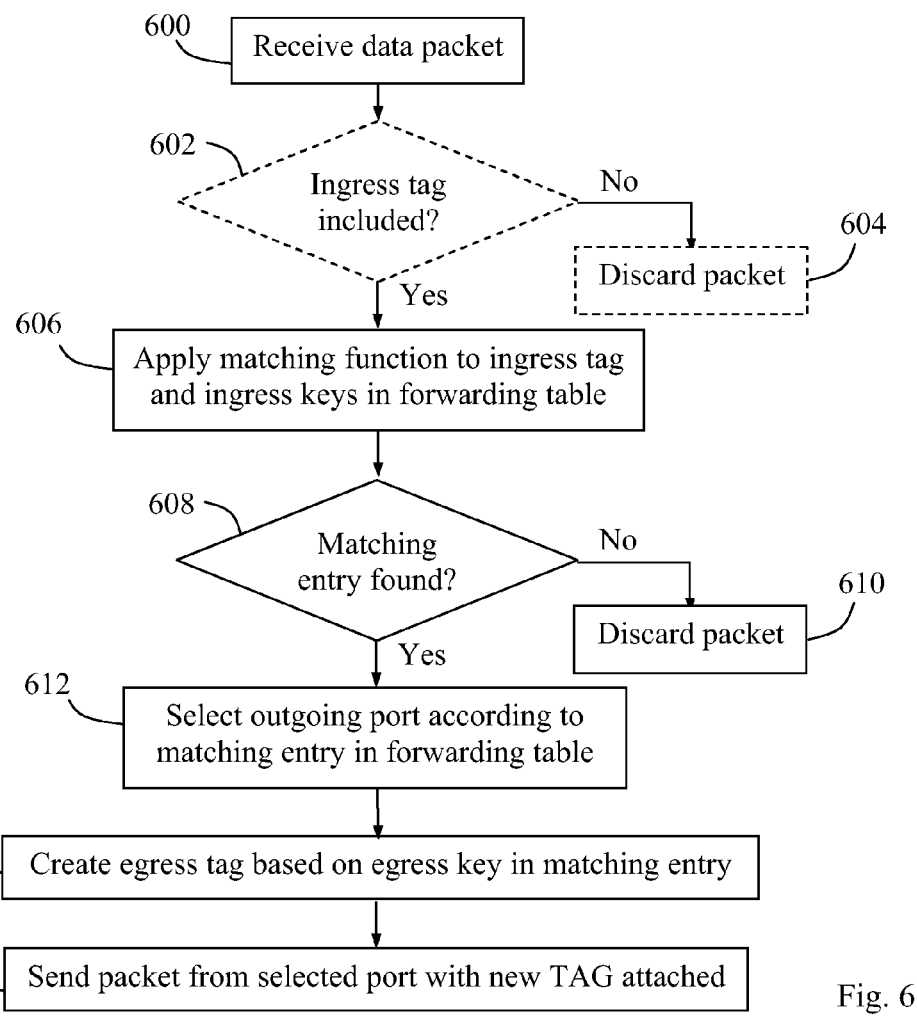
FIG. 6 is a flow chart with steps in a procedure performed by a router in a packet-switched network for controlling transmission of data packets, according to yet another embodiment.

FIG. 6 is a flow chart with steps in an exemplary procedure for controlling transmission of data packets in packet-switched network, as executed by a router in the network, e.g. the router 302 in FIG. 3. In a first step 600, a data packet is received by the router. The packet may have been transmitted either from a neighbouring router or from a sending end-host as the first hop.

In an optional next step 602, it may be checked whether the packet contains an ingress tag generated from a sender key that the DNS system has provided, e.g. as described above for step 3:7 and step 3:6. If no such ingress tag is found, the packet could be discarded in a further step 604. On the other hand, if the packet contains an ingress tag, a matching operation is executed to the received ingress tag and different ingress keys in the forwarding table, using a known tag derivation function as described above for step 3:9, in a following step 606, in order to find a matching entry in the table. If key indexing is used in the forwarding table and a key index is also attached to the received packet, the key index can be used in this step to limit the matching operation to one entry or just a few entries and rapidly find the correct entry in the table.

In a next step 608, it is determined whether a matching key is found in the forwarding table by means of the matching operation, e.g. in the manner described above for step 3:9 in FIG. 3. If not, the packet is discarded in a step 610. If a matching entry is found, the port in the matching entry is selected as outgoing port for the packet, in a further step 612. Then, an egress tag is created in a step 614 by applying a tag derivation function to an egress key in the matching table entry. Finally, the packet is sent to the next hop node from the determined port with the created new egress tag attached, in a last shown step 616.

If key indexing is used, an egress key index in the matching table entry may also be attached to the packet. The receiving next hop node is then able to basically repeat the procedure according to steps 600-616 above. As mentioned above for step 3:11, the ingress/egress tag may not be changed between two or more successive routers. Hence, depending on the implementation, it may not be necessary to perform step 614 in exactly all the routers in the transmission path, in that case sending the packet in step 616 with the received ingress tag attached and reused as egress tag.

Figure 7:
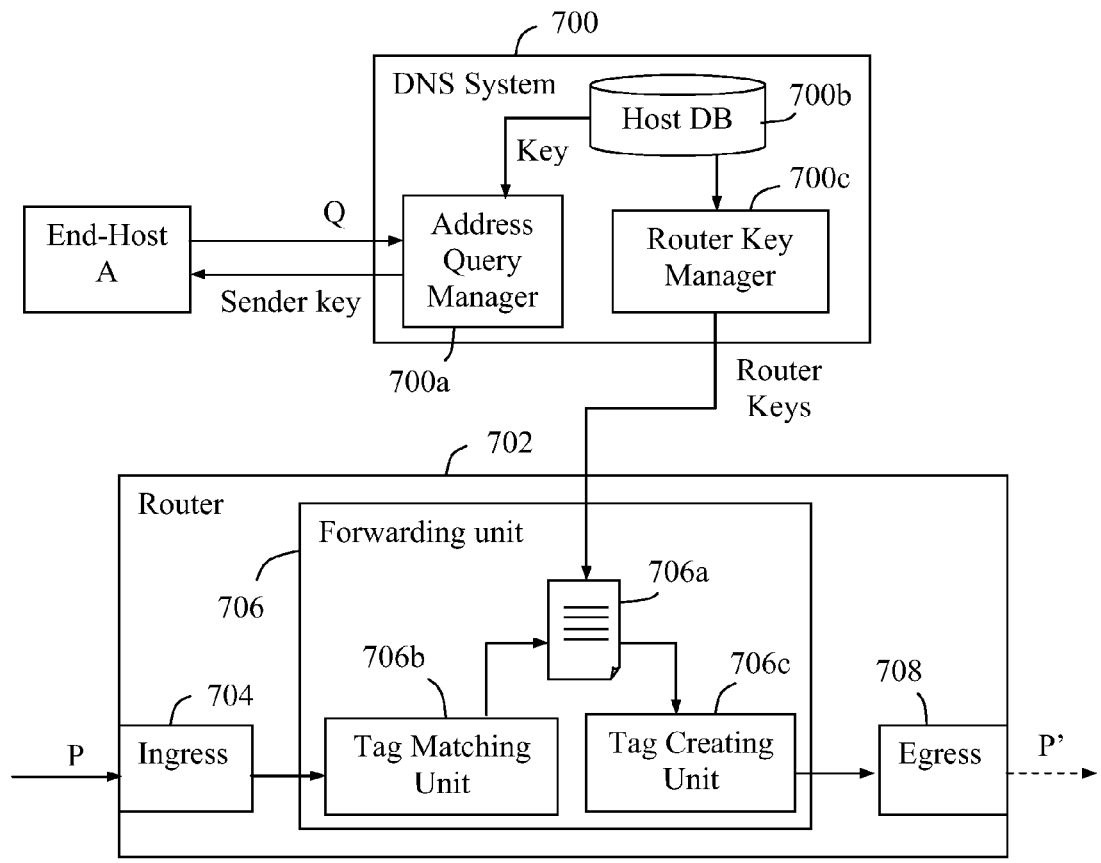
FIG. 7 is a schematic block diagram illustrating a DNS server system and a router in a packet-switched network in more detail, according to further embodiments.

FIG. 7 is a logic block diagram illustrating in more detail an apparatus in a DNS server system 700 and an arrangement in a router 702 in a packet-switched network, for controlling transmission of data packets in the network, in accordance with further exemplary embodiments. DNS server system 700 comprises an address query manager 700a adapted to receive an address query Q from a first end-host, basically requesting a useful sender key for a target second end-host. DNS server system 700 further comprises a host database 700b for generally registering destination keys associated with end-hosts. In particular, the host database 700b is adapted to provide a destination key registered for the second end-host. Host database 700b may also hold information indicating which end-hosts are authorised to send packets to each registered end-host. This information may comprise policies defined for the registered end-hosts and determining if a querying end-host is authorised to send data packets to a particular destination.

DNS server system 700 also comprises a router key manager 700c adapted to create and distribute router keys and optional key indexes to routers in the network, including router 702. The address query manager 700a is also adapted to create a sender key by applying a KDF to at least the destination key of the second end-host, and to provide the sender key to the first end-host in response to the address query Q. Thereby, the first end-host is able to get across data packets to the second end-host by creating a sender tag from the received sender key and attaching the sender tag to each data packet transmitted to the second end-host. The received sender key may be valid only for a particular session or data flow, such that the first end-host must obtain a new sender key for any further sessions or data flows with the second end-user. Thus, the sender tag above is attached to packets in a particular session or data flow.

The router 702 comprises an ingress part 704 adapted to receive a data packet P from a neighbouring node such as another router in the network, or directly from a sending end-host. The ingress part 704 may be further adapted to admit the packet if a valid ingress tag is attached to the packet, and to otherwise discard the packet if not including a valid ingress tag.

The router 702 also comprises a forwarding unit 706 including a forwarding table 706a and a tag matching unit 706b for matching the received ingress tag with ingress keys in forwarding table 706a, to determine an outgoing port for the packet, e.g. in the manner described for steps 3:9-3:10 in FIG. 3 and steps 606-612 in FIG. 6, respectively. The forwarding unit 706 further includes a tag creating unit 706c for creating an egress tag for the packet. The router 702 also comprises an egress part 708 adapted to send the packet to the next hop node, e.g. another neighbouring router, from the determined outgoing port with the created new egress tag attached to the packet.

Figure 8:
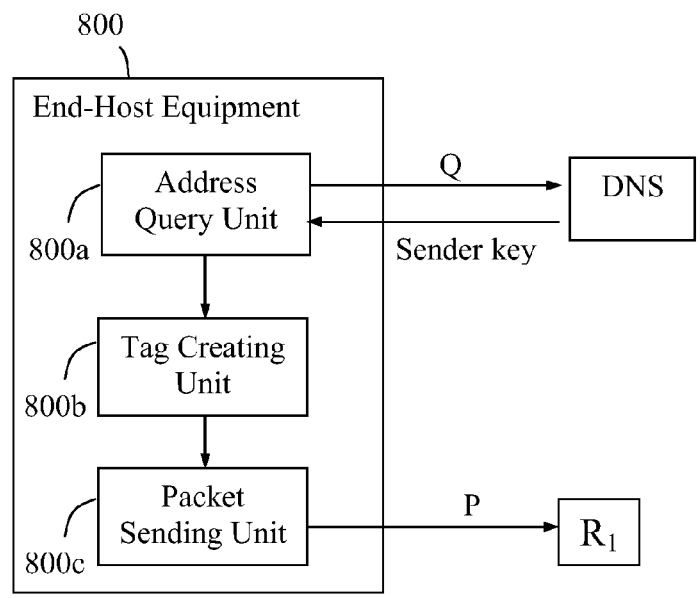
FIG. 8 is a schematic block diagram illustrating an end-user equipment in more detail, according to yet another embodiment.

FIG. 8 is a logic block diagram illustrating in more detail an apparatus in an end-user equipment 800 for enabling control of transmission of data packets in a packet-switched network, in accordance with another exemplary embodiment. The end-user equipment 800 comprises an address query unit 800a adapted to send an address query "Q" for a second end-host to a DNS system "DNS", and to receive a sender key from the DNS system derived from a destination key that has been registered for the second end-host, in response to the query.

The end-user equipment 800 further comprises a tag creating unit 800b adapted to create a sender tag by applying a tag derivation function TDF to at least the received sender key, and a packet sending unit 800c adapted to attach the sender tag to data packets P and then send the data packets P to a first-hop router $R_1$.

It should be noted that FIGS. 7 and 8 merely illustrate various functional units in the DNS system 700, router 702 and end-user equipment 800, respectively, in a logical sense. However, the skilled person is free to implement these functions in practice using any suitable software and hardware means. Thus, the present invention is generally not limited to the shown structure of the DNS server system 700, router 702 and end-user equipment 800.

In this solution, a router can thus match an ingress tag included in a received data packet with routing or ingress keys in the forwarding table, in the manner described above, to verify the packet and, at the same time find the correct outgoing port. If a match is found in an entry of the forwarding table, the port number in that entry is determined to be the correct outgoing port for the packet.

The described embodiments enable a forwarding architecture where scalable forwarding tables can be used in routers. The routing of data packets can also be controlled to avoid flooding, spamming, virus, fraud, DoS attacks and generally unsolicited traffic. While the invention has been described with reference to specific exemplary embodiments, the description is generally only intended to illustrate the inventive concept and should not be taken as limiting the scope of the invention. The present invention is defined by the appended claims.

The invention claimed is:

1. A method of controlling transmission of data packets in a packet-switched network, comprising the following steps performed by a router in the network:
receiving a data packet comprising an ingress tag derived from a sender key or router key using a first tag derivation function TDF known by the router, wherein the sender key or the router key have been encoded by the first TDF to conceal the sender key or the router key from a third party that does not know the first TDF;

executing a matching operation to the received ingress tag and at least one entry in a forwarding table, said entry comprising an ingress key and a corresponding outgoing port number, using said first TDF to decode the ingress key in the said entry in the forwarding table to determine whether the received ingress tag matches the decoded ingress key in said entry; and in response to finding a matching entry in the forwarding table, sending the packet to a next hop node from an outgoing port indicated in the matching entry in the forwarding table, and responding to not finding a matching entry in the forwarding table by discarding the packet.

2. The method according to claim 1, wherein each matching operation includes applying the first TDF to a candidate ingress key in a row of the forwarding table to derive a candidate ingress tag, and a match is considered to be found in response to when the candidate ingress tag satisfies a predetermined relation with the received ingress tag in the packet.

3. The method according to claim 2, wherein the predetermined relation is equality, so that a match is considered to be found in response to the candidate ingress tag being identical to the ingress tag in the packet.

4. The method according to claim 1, wherein an egress tag is created by applying a second tag derivation function TDF' to an egress key in the matching entry in the forwarding table, and the egress tag is attached to the data packet when sent to the next hop node.

5. The method according to claim 1, wherein the received data packet further contains a key index pointing to an entry or a set of entries in the forwarding table, and the key index is used to find the proper entry/entries for the matching operation.

6. An apparatus in a router of a packet-switched network, for controlling transmission of data packets in the network, the apparatus comprising:

an ingress unit that receives a data packet comprising an ingress tag derived from a sender key or router key using a first tag derivation function TDF known by the router, wherein the sender key or the router key have been encoded by the first TDF to conceal the sender key or the router key from a third party that does not know the first TDF;

a tag matching unit that executes a matching operation to the received ingress tag and at least one entry in a forwarding table, said entry comprising an ingress key and a corresponding outgoing port number, using said first TDF to decode the ingress key in the said entry in the forwarding table to determine whether the received ingress tag matches the decoded ingress key in said entry; and an egress unit that sends the data packet to a next hop node, wherein in response to finding a matching entry in the forwarding table, the data packet is sent from an outgoing port indicated in the matching entry in the forwarding table, and in response to not finding a matching entry in the forwarding table the data packet is discarded.

7. The apparatus according to claim 6, further comprising a tag creating unit that creates an egress tag by applying a second tag derivation function TDF' to an egress key in the matching entry in the forwarding table, and for attaching the egress tag to the data packet when sent to the next hop node.

8. A method of controlling transmission of data packets in a packet-switched network, comprising the following steps performed by a Domain Name Server (DNS) system:

registering destination keys for end-hosts in the network;

distributing router keys to routers in the network, each router key being derived from a registered destination key representing an end-host and/or from network topology information;

receiving an address query from a first end-host regarding a second end-host;

creating a sender key by applying a key derivation function KDF to at least a destination key associated with the second end-host, wherein the created sender key conceals the destination key associated with the second end-host; and sending the created sender key to the first end-host in response to said address query, thereby enabling the first end-host to get across data packets to the second end-host by attaching a sender tag generated from said sender key to a transmitted data packet, the sender tag directing said transmitted data packet to the second end-host.

9. The method according to claim 8, wherein authentication of the first end-host is required in order to process the query, and the query is rejected in response to the first end-host not being authenticated.

10. The method according to claim 9, wherein authorisation via Dynamic Host Configuration Protocol (DHCP) is required from the first end-host and a DHCP server provides to the first end-host a operation for querying the DNS server system, only if the first end-host is authorised via DHCP.

11. The method according to claim 8, wherein a policy defined for the second end-host is applied to the query to determine if the first end-host is authorised to send data packets to the second end-host, and the query is rejected in response to determining that the first end-host is not authorised, 12. The method according to claim 8, wherein the sender key is created by applying the KDF also to the identity of the first end-host, and/or a time stamp, and/or to a random number.

13. The method according to claim 8, wherein said router keys represent a single end-host or a set of multiple end-hosts depending on the network topology and the location of those end-hosts relative to said network topology.

14. The method according to claim 8, further comprising:

distributing key indexes to said routers in the network, each of said key indexes identifying at least one of said router keys;

identifying, by the second end-host one or more rows in a forwarding table based on a received key index.

15. An apparatus in a Domain Name Server (DNS) server system for controlling transmission of data packets in a packet-switched network, comprising:

a host database for registering destination keys associated with end-hosts;

a router key manager that distributes router keys to routers in the network, each router key being derived from a destination key representing an end-host and/or from network topology information; and an address query manager that receives an address query from a first end-host regarding a second end-host, create a sender key by applying a key derivation function to at least a destination key associated with the second end-host, wherein the created sender key conceals the destination key associated with the second end-host, and to send the created sender key to the first end-host in response to the address query, thereby enabling the first end-host to get across data packets to the second end-host by attaching a sender tag generated from said sender key to a transmitted data packet, the sender tag directing said transmitted data packet to the second end-host.

16. A method of enabling control of transmission of data packets in a packet-switched network, comprising the following steps performed by an end-host equipment used by a first end-host:
sending an address query for a second end-host to a Domain Name Server (DNS) system;
receiving a sender key from the DNS system in response to said address query, the sender key being derived from a destination key associated with the second end-host by applying a key derivation function KDF to at least said destination key of the second end-host, wherein the sender key conceals the destination key associated with the second end-host;
creating a sender tag by applying a tag derivation function TDF to at least the received sender key;
attaching the created sender tag to data packets directed to the second end-host; and
sending said data packets to a first-hop router.

17. The method according to claim 16, wherein a key index identifying one or more router keys in a forwarding table of a first-hop router, is also received from the DNS system in response to said query, and said key index is attached to data packets transmitted by the first end-host to the second end-host.

18. The method according to claim 16, wherein the sender tag is created by applying the TDF also to at least part of the payload in the packet and/or to a random number.

19. An apparatus in an end-host equipment for use by a first end-host and for enabling control of transmission of data packets in a packet-switched network, the apparatus comprising:
an address query unit that sends an address query for a second end-host to a Domain Name Server (DNS) system, and to receive a sender key from the DNS system derived from a destination key of the second end-host, in response to said query, wherein the sender key conceals the destination key associated with the second end-host;
a tag creating unit that creates a sender tag by applying a tag derivation function TDF to at least the received sender key; and
a packet sending unit that attaches the sender tag to data packets and then sending the data packets to a first-hop router.

* * * * *